(No Model.)

W. BARLEY.
FEED BAG SUPPORT.

No. 426,654. Patented Apr. 29, 1890.

Witnesses:
Clifford J. White
J. H. Dyrenforth

Inventor:
Wesley Barley,
By Dyrenforth & Dyrenforth,
Att'ys

UNITED STATES PATENT OFFICE.

WESLEY BARLEY, OF CHICAGO, ILLINOIS, ASSIGNOR OF ONE-HALF TO MONROE J. FRIEDMAN, OF SAME PLACE.

FEED-BAG SUPPORT.

SPECIFICATION forming part of Letters Patent No. 426,654, dated April 29, 1890.

Application filed November 7, 1889. Serial No. 329,480. (No model.)

*To all whom it may concern:*

Be it known that I, WESLEY BARLEY, a citizen of the United States, residing at Chicago, in the county of Cook and State of Illinois, have invented a new and useful Improvement in Feed-Bag Supports, of which the following is a specification.

My invention relates to improvements in feed-bag supports, for especial use with horses wearing harnesses with which collars are employed. My object is to provide a support of the above class of novel construction, to fasten upon the horse-collar at the part of the latter which extends under the neck of the horse, and operate without other sustaining means to maintain the feed-bag in the position most desirable for the horse while feeding. In all other supports of this class, and of which I am aware, the feed-bag is upheld by rods, chains, cords, or the like, which extend from points upon the collar at the side of or above the horse's neck. Such supports are objectionable, for the reason that the horse while feeding, and especially during the season when flies are troublesome, is apt to move his head to either side and displace the supports or rub against them, so as to jar the feed out of the bag and produce waste.

Figure 1:
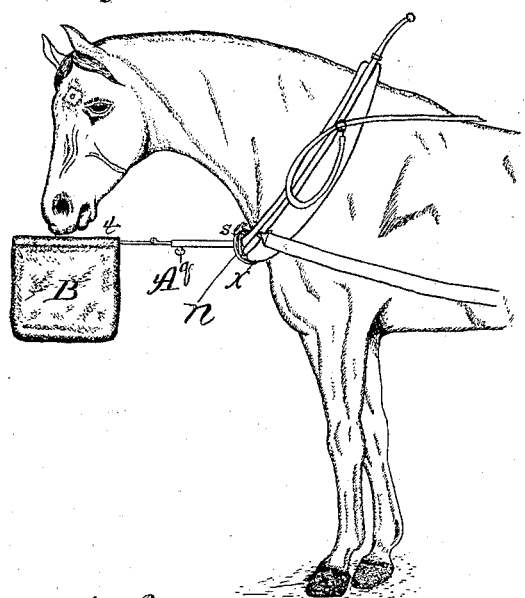
Figure 2:
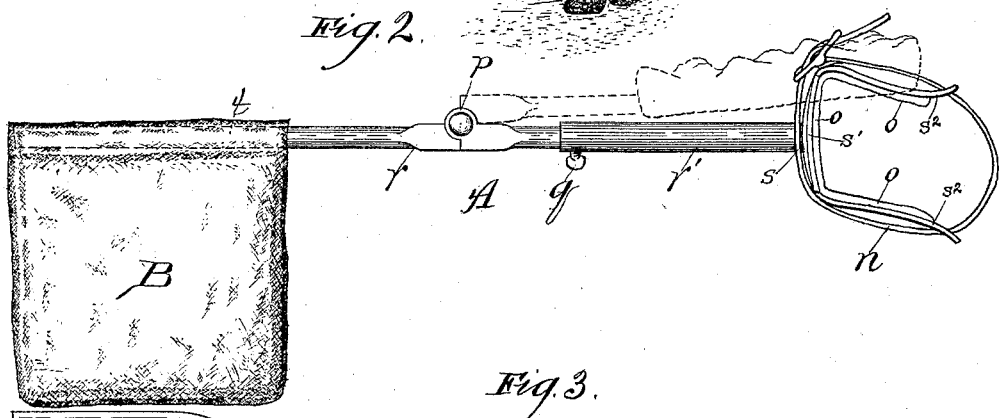
Figure 3:
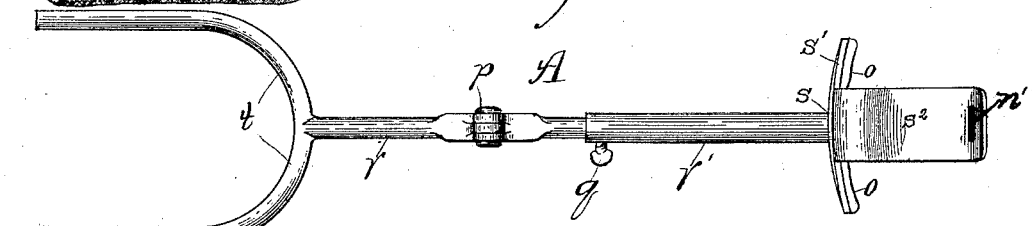

In the drawings, Figure 1 is a broken perspective view illustrating my improved feed-bag support in operative position on a horse; Fig. 2, an enlarged view, in side elevation, of the support and feed-bag, the manner of folding the support being indicated by dotted lines; and Fig. 3, a top plan view of the device.

The support comprises, broadly, a rod or frame A, provided at one end $t$ with a support for a feed-bag B, and arranged at its opposite end $s$ to fasten upon a horse-collar $x$. The rod A is constructed, preferably, to lengthen and shorten, and may be in telescoping sections $r$ $r'$, secured together by a set-screw $q$. About midway of the device the rod A is provided with a hinge-joint $p$, whereby the two sections may be folded against each other, as indicated in Fig. 2, when the device is not in use. The securing end $s$ comprises a curved and slightly-concave plate $s'$ and two flat arms $s^2$. The plate $s'$ projects laterally from opposite sides of the rod, and is arranged to fit one surface of the horse-collar. The arms $s^2$ extend in a downward inclined direction from the upper and lower edges, respectively, of the plate $s'$, and are arranged to embrace the inner and outer surfaces of the lower portion of the horse-collar, and cause the rod to extend in a substantially horizontal direction. The inner surface of the part $s'$ $s^2$ may be provided with padding $o$, preferably of leather, canvas, or other soft material, to prevent the horse-collar from being injured by contact with it of the support.

When the device is adjusted upon the horse-collar, it is held securely in place by a strap $n$, which is caused to pass through eyes $n'$ in the arms $s^2$, and extend around the collar and over the surface of the plate $s'$, as shown. The telescoping feature of the rod enables the device to be lengthened or shortened to adapt it to any horse.

When the support is attached to the collar as described, it operates to hold the feed-bag in such a way that the horse will have no difficulty in reaching every part of the interior of the bag to empty it. As the bag is free from the horse's head, he need not keep his nose in the bag during the entire time of feeding, as in the case of feed-bags which are fastened over the head of the horse, and which are considered unhealthy, as they cause the horse to breathe the dust from the grain, and as the relative position of the feed-bag is not changed by movement of the horse the danger of his wasting his feed is materially reduced over that incident to the use of stationary feed-boxes.

What I claim as new, and desire to secure by Letters Patent, is—

1. A feed-bag support comprising, in combination, a rod A, provided at one end with a holder for the feed-bag and at its opposite end with arms $s^2$, fitting upon the collar and conforming thereto at the throat portion, and a strap $n$ for connecting the ends of the arms $s^2$ over the rear of the collar, whereby the bag is maintained in fixed position with relation to the collar by means of the attachment formed by the arms $s^2$ and strap $n$ alone, substantially as described.

2. A feed-bag support comprising, in combination, a rod A, having the joint $p$, and bifurcated toward one end to afford a holder $t$ for the feed-bag, plate $s'$ at the opposite end of the rod, having downward inclined arms $s^2$ provided with eyes $n'$, and a strap $n$, substantially as and for the purpose set forth.

WESLEY BARLEY.

In presence of—
J. W. DYRENFORTH,
M. J. FROST.